| United States Patent [19]
McConnell et al.

[11] 3,887,698
[45] June 3, 1975

[54] SACS WITH EPITOPIC SITES ON WALLS ENCLOSING STABLE FREE RADICALS

[75] Inventors: Harden M. McConnell, Palo Alto; Gillian K. Humphries, Los Altos, both of Calif.

[73] Assignee: The Board of Trustees of Leland Stanford Junior University, Stanford, Calif.

[22] Filed: Feb. 25, 1974

[21] Appl. No.: 445,392

Related U.S. Application Data

[63] Continuation-in-part of Ser. No. 339,775, March 12, 1973, abandoned.

[52] U.S. Cl.............. 424/12; 23/230 B; 424/8; 424/11; 424/13; 424/88
[51] Int. Cl....G01n 27/00; G01n 31/02; G01n 33/16
[58] Field of Search ............ 424/8, 11, 12, 13; 23/230 B

[56] References Cited
UNITED STATES PATENTS

3,453,288  7/1969  McConnell .............. 260/326.8
3,690,834  9/1972  Goldstein .................. 23/230 R

OTHER PUBLICATIONS

Knudson, Disst. Abs. Vol. 33 (1), 1972, p. 293B.
Kornberg, Biochem. Vol. 10, No. 7, 1971 pp. 1111–1120.
Alving, Biochem. Vol. 8, No. 4, 1969 pp. 1582–1587.
Chapman, Ann. N.Y. Acd. of Sci. Vol. 195, 1972 pp. 179–206.
Kinsky, Ann. N.Y. Acd. of Sci. Vol. 195, 1972 pp. 429–438.
Chapman, Chem. Abs. Vol. 71, 1969, No. 359993u

*Primary Examiner*—Albert T. Meyers
*Assistant Examiner*—A. P. Fagelson

[57] ABSTRACT

A novel immunoassay technique is provided employing sacs having a lysable membrane and at least one determinant or epitopic site recognizable by an antibody. Enclosed in the sacs are water soluble stable free radical compounds, which are capable of escape from the sac upon lysis. The immunoassay can be employed for determination of an epitope containing compound, antibodies or complement.

Two basic modes are employed. The first mode depends upon the difference in the EPR spectrum of the stable free radical when enclosed in the sac, at relatively high localized concentration, and when free in solution, at relatively low concentration. The amount of the free radical compound free in solution is dependent upon available antibody bound to the sacs and available complement.

The second mode can be used for the determination of an epitope containing compound or antibody. In this mode, the antibody agglutinates the sacs, the agglutinated sacs are separated from the non-agglutinated sacs and either or both of the differentiated sacs lysed and the amount of free radical determined.

The immunoassay is extremely sensitive and has a high multiplication factor, because a single event results in the freeing of a large number of free radical molecules.

12 Claims, No Drawings

SACS WITH EPITOPIC SITES ON WALLS ENCLOSING STABLE FREE RADICALS

The invention described herein was made in the course of work under a grant or award from the Department of Health, Education and Welfare.

CROSS-REFERENCE TO RELATED APPLICATION

This application is a continuation-in-part of application Ser. No. 339,775, filed Mar. 12, 1973, now abandoned, whose disclosure to the extent that it includes matter not included in this application, is incorporated herein by reference.

BACKGROUND OF THE INVENTION

1. Field of the Invention

The detection of the presence of low concentrations of a wide variety of biologically active materials has become increasingly important in the medicinal, as well as other, fields. The possibility of detecting minute quantities of drugs, antibodies, hormones, toxins, viruses, proteins, and the like, offers an opportunity to investigate, diagnose and control a wide variety of situations involving biological systems. The amounts of interest are generally in the microgram or lower quantities, in some instances being of the order of picograms. Therefore, in attempting to detect small amounts of a specific material, one must have a probe which is highly specific for the material of interest and must provide a signal which is detectable and varies with the amount of material being determined.

The use of stable free radicals as a detecting molecule has many advantages. Free radicals can be detected in opaque solutions. Also, the free radical can be chosen, so that naturally occurring interferants are avoided or readily removed. However, it is found that for concentrations of free radicals substantially less than a $\mu$mole/l., one is unable to detect a signal with conventional equipment. Therefore, the use of a free radical or spin-label detector has been limited where concentrations of interest are substantially below $\mu$mole/l. quantities.

2. Description of the Prior Art

Articles disclosing lysis of sacs containing glucose or enzymes include "Complement-Dependent Damage to Liposomes Prepared from Pure Lipids and Forssman Hapten," S. C. Kinsky et al., Biochemistry, Vol. 8, No. 10, pp. 4149–4158, October 1969, "Immune Damage to a Lipid Model Membrane," S. C. Kinsky, Annals New York Academy of Sciences, Vol. 195, pp. 429–438; and Kataoka et al., Biochem. et Biophys. Acta, 298, 158 (1973).

U.S. Pat. Nos. 3,453,288 (McConnell); 3,481,952 (McConnell et al.) and 3,489,522 (McConnell) disclose the attachment of electron spin resonance labels to biomolecules, whereby the concentration of biomolecules (biologically active molecules) can be determined by examination of changes in the EPR (electron paramagnetic resonance, sometimes referred to as ESR or electron spin resonance) spectrum of a biologically active molecule from another otherwise identical biologically active molecule which has been reacted with another biological substance.

U.S. Pat. No. 3,690,834 discloses an immunoassay technique employing a spin label detector which is bonded to a hapten. The spin labeled hapten is capable of competing with free hapten for antibody. The EPR spectrum differs between spin labeled hapten bound to antibody and unbound spin labeled hapten.

SUMMARY OF THE INVENTION

An immunoassay is provided for determining compounds having a determinant or epitopic site, i.e., antigens and haptens, antibodies or complement, based on the availability of antibody and/or complement. Sacs are provided having stable free radicals enclosed therein at a sufficiently high concentration to affect the EPR spectrum of the stable free radical, as well as having at least one epitopic site bound to the wall of the sac, which is recognizable by the antibody. The sacs are allowed to react with available antibody and those sacs bound to antibody lysed.

The amount of available antibody is affected not only by its own concentration, but by the presence of a compound having an epitopic site which binds to the antibody. Lysis of the sacs bound to antibody can be achieved either without separation with complement or after separation of agglutinated sacs by any convenient lysing agent, e.g., a detergent. The EPR spectrum of the stable free radicals free in solution may then be determined and compared to standards using known concentrations of the various components.

DESCRIPTION OF THE SPECIFIC EMBODIMENTS

The subject immunoassay technique for determining compounds having epitopic sites, antibodies or complement provides a substantial multiplication factor in that a single event releases from a sac a large number of stable free radical molecules, whose EPR spectrum can be distinguished from the EPR spectrum when enclosed in the sac. When the free radical molecules are contained in the sac, they are packed relatively closely and broaden the spectrum of one another (spin-exchange and/or dipolar broadening), so that a relatively broad flat spectrum results. When the spin label molecule is free in solution and at relatively low concentrations, a sharp peak results, i.e., the peak half-width for the sac-enclosed free radicals is substantially greater than the peak half-width for the free radicals free in solution. Therefore, one obtains a greatly enhanced peak intensity or amplitude between peaks.

The immunoassay of this invention is based on the employment of antibodies which are capable of recognizing a specific spatial and chemical structure, which is referred to as an epitopic or determinant site. By having an epitopic site on a sac enclosing a relatively high concentration of stable free radical molecules, a distribution will result of sacs bound to antibodies which can be lysed by complement and sacs which are not lysed by complement.

When the amount of antibody is a limiting factor, the bound sacs may be lysed either with complement or be separated by an agglutination technique and then lysed by any convenient means. When lysed by complement, one can determine the amount of available antibody as a result of the change in EPR spectrum from the stable free radicals enclosed in the sacs, as compared to the stable free radicals free in solution. With the agglutination technique, one can separate the agglutinated sacs, lyse the sacs either in the supernatant or in the precipitate, and determine the amount of stable free radicals present in either or both of the media. By employing standards with known concentrations of the various components, one can then determine the amount of the component of interest which is present.

Where complement is in a limited amount, one can use excess sacs and antibody and determine the amount of complement by the rate at which free radical molecules are released into solution or the total amount of the free radical molecules released into solution.

Before considering the subject invention in further detail, a number of terms used in the specification will be defined:

1. Antigen: any substance capable of provoking an immune response of any type in an immunologically competent vertebrate, particularly the stimulation of the production of specific antibodies. Antigens are substances of high molecular weight, including proteins, glycoproteins, glycolipids, polysaccharides, and lipopolysaccharides.

2. Hapten: an incomplete antigen, incapable of itself in provoking an immune response, but when bound to an antigenic material, antibodies will be formed which will specifically recognize the hapten molecule.

3. Epitope: a specific chemical and spatial configuration which is specifically recognized by an antibody. Antigens and haptens may have one or more epitopic sites, antigens usually having a plurality of epitopic sites.

4. Sac: a bag of any material enclosing a volume, having a wall composed of one or more components and having at least one internal compartment with the wall of the compartment forming a permeability barrier to the outside.

5. Vesicles: a term used to cover both single and multi-compartmented sacs, but used herein solely to cover single compartmented sacs.

6. Ghosts: sacs obtained from cells by removing cellular contents by opening the cellular membrane, either by physical or chemical means, so as to substantially empty the cell of its contents and then sealing the membrane, so as to enclose the material present in the sealing solution. Ghosts are most frequently prepared from red blood cells (erythrocytes) of mammals.

7. Liposomes: multi-compartmented bodies obtained when lipids, particularly lipid mixtures, are dispersed in aqueous suspension by vigorous agitation. The walls or membranes are composed of a continuous lipid bilayer. See Kornberg et al., Biochemistry, 10, 1111 (1971).

For the purpose of this invention, vesicles, liposomes, and ghosts are suitable sacs. Suitable membranes may be formed as set forth in Kinsky and Kinsky et al., supra, and methods described in this application.

The membrane wall of the sac will vary depending upon whether the sac is derived from a naturally occurring cell or is synthetically prepared, e.g., liposomes. The naturally occurring sacs or ghosts have a membrane composed primarily of lipids and protein in approximately equal portions.

The ghosts can be formed by employing erythrocyte cells suspended in a solution of substantially lower osmolarity. After centrifuging the lysed cells, the cells are placed in a "resealing solution" of appropriate osmolarity, and containing alkali and alkaline earth metal halides and a coenzyme, e.g., adenosine triphosphate. Included in the resealing solution is a water soluble stable free radical at the appropriate concentration to provide the desired concentration of the free radical in the ghost.

Synthetic sacs or liposomes can be prepared from a wide variety of lipids, including phospholipids, glycolipids, steroids, relatively long chain alkyl esters, e.g., alkyl phosphates, fatty acid esters, e.g., lecithin, fatty amines, and the like. Preferably, mixtures of fatty materials are employed, particularly a combination of a neutral steriod, a charged amphiphile and a phospholipid.

Illustrative phospholipids include lecithin, sphingomyelin, dipalmitoyl lecithin, sheep fraction IIa, Kinsky, supra, or the like.

The steroid can conveniently be cholesterol, cholestanol, lanosterol, or the like.

The charged amphiphilic compound, normally of from 12 to 30 carbon atoms, is conveniently a mono- or dialkyl phosphate ester or an alkylamine, e.g., dicetyl phosphate, stearyl amine, hexadecyl amine, dilauryl phosphate, or the like.

The liposomes are readily prepared by adding the materials in an aqueous medium containing the stable free radicals and vigorously agitating the solution at moderate temperatures. The liposomes are then freed of the outside spin lable by chromatography.

Sensitized sacs can be achieved in a variety of ways. With ghosts formed from naturally occurring cells, the determinant sites may be naturally present in the membrane wall. For active sensitization, normally requiring an amphipathic antigen or hapten, the antigen or hapten is included in the solution at the time of formation of the liposome. For passive sensitization, the amphipathic antigen or hapten is added after formation of the liposome and is adsorbed onto the surface. Finally, covalent sensitization can be carried out by employing a difunctional reagent, having the same or different functionalities, which will covalently bond to the ghost or liposome, as well as to the antigen or hapten. Alternatively, a monovalent reagent may be used such as a carbodiimide.

The various sensitization techniques are well known in the art. See for example the references cited previously and Golub et al., J. Immunol. 100, 133–137 (1967).

Depending on the particular source of the sac, the size of the sac will vary. For ghosts, the size of the sac will normally be from about 1 to 80 $\mu^3$, more usually 5 to 20 $\mu^3$. For liposomes, the volume of the sac will vary from about 0.1 to 150 $\mu^3$, more usually from 1 to 80 $\mu^3$. It is found that the membrane will generally have a thickness of about 100 A.

The free radical concentration will vary, depending on the method of preparation, as well as the particular free radical. Desirably, the concentration of the free radical in the sac should provide a ratio of the EPR line width exhibited by the free free radical molecule as compared to the enclosed free radical molecule of no more than about 0.7, preferably no more than about 0.3. Normally, the concentration of the free radicals in the sac should not exceed 0.3 osmolarity for non-ionic free radicals, and generally not exceed 0.15 osmolarity for ionic free radicals. Generally, the concentration of free radicals in the sac will be at least about 0.02M, more usually at least about 0.03M. The concentrations are chosen so the EPR spectrum of the enclosed free radical should be at least about 3 gauss in half width (peak to peak) at a resonance frequency of about 9.2 GHz (gigahertz) more usually at least about 3.5 gauss at 9.2 GHz.

A wide variety of stable free radicals may be employed. The factors concerning the stable free radical are water solubility, minimal leakage from the sac, strong interactions when enclosed in the sac, a reasonably narrow EPR spectrum at low concentration and a broad EPR spectrum at high concentration and a reasonably high peak height or amplitude.

Inorganic compounds can be employed having ions which exhibit the desired EPR spectrum. For example, manganous ion (Mn++) may be employed. However, for the most part, stable organic free radicals will be employed, and of these, the nitroxide free radical is preferred.

The organic nitroxide radicals will generally be of from 6 to 40 carbon atoms.

The free radicals employed preferably have a simple EPR spectrum and are water soluble. The nitroxide free radicals are particularly suitable and may be cyclic or acyclic. The nitroxide will have the following formula:

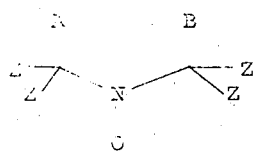

wherein:
Z is other than hydrogen, usually hydrocarbon, and more usually alkyl;
A and B may be the same or different and may be taken together to form a ring; A and/or B will have a neutral or charged water solubilizing group, e.g., ammonium salt, hydroxyl (sugar), acid group, etc.

For the most part, the nitroxide free radical will have the following formula:

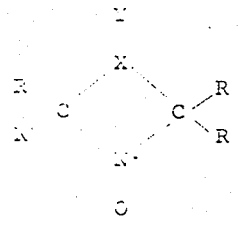

wherein:
the R groups may be the same or different and are normally lower alkyl of from 1 to 3 carbon atoms, preferably methyl;
X is a divalent radical of from 2 to 6 carbon atoms and from 0 to 2 heteroatoms which are oxygen, sulfur or nitrogen and from 0 to 1 site of ethylenic unsaturation, forming a 5 or 6 membered ring with the carbon atoms to which X is attached; and
Y is a water solubilizing group which may be a tetraalkyl ammonium salt of from 4 to 8 carbon atoms, normally having a halide, e.g., chloride counterion, which may be substituted with from 0 to 3 oxy groups, e.g., hydroxy, more usually 0 to 1; a phosphate or phosphonate salt, particularly alkali metal salt, e.g., sodium, a nucleotide, or a sugar, of from 5 to 24 carbon atoms particularly mono- to tri-saccharides, glucosamines, or the like.

Illustrative compounds include:

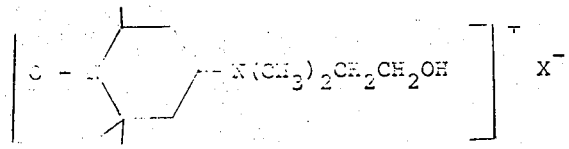

N,N-Dimethyl, N-(2',2',6',6'-tetramethyl-1-oxylpiperidyl-4') 2-hydroxyethylammonium ion, where X⁻ = a negative ion, e.g., chloride, fluoride, phosphate, or the like;

tempophosphate salts having the general formula:

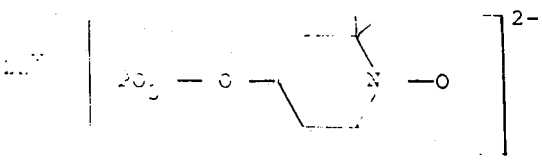

1-oxyl-2,2,6,6-tetramethylpiperidinyl-4-phosphate where Z⁺ = a metal or ammonium ion, e.g., sodium, potassium, or the like.

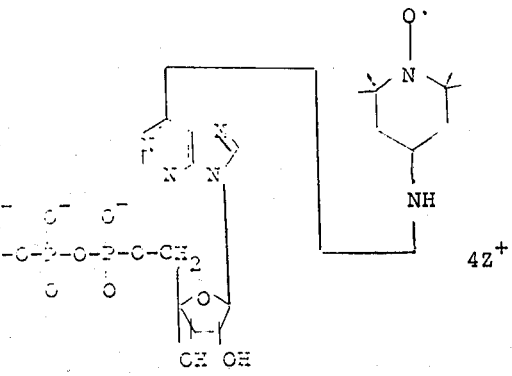

N⁶-(1-oxyl-2,2,6,6-tetramethyl-4-piperidinyl) adenosine triphosphate.

Examples of useful polar but non-ionic organic free radical molecules are:

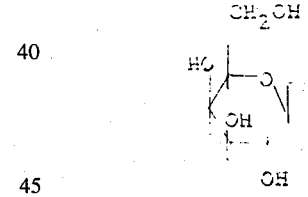

1-Oxyl-2,2,6,6-tetramethylpiperidinyl-4-β-D-galactoside

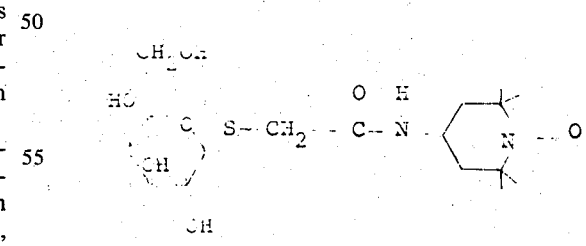

N-(1-oxyl-2,2,6,6-tetramethylpiperidinyl-4) carbamoylmethyl-β-D-thiogalactoside

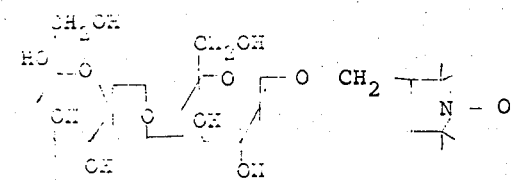

(1-oxyl-2,2,5,5-tetramethyl-3-pyrrolidinyl)methyl-β-D-lactoside

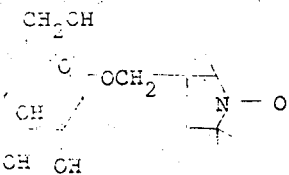

(1-oxyl-2,2,5,5-tetramethyl-3-pyrrolidinyl)methyl-β-D-thiogalactoside

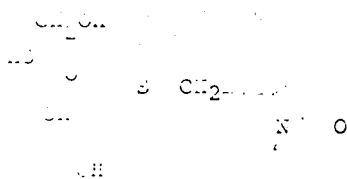

(1-oxyl-2,2,5,5-tetramethyl-3-pyrrolidinyl)methyl-β-D-glucopyranose

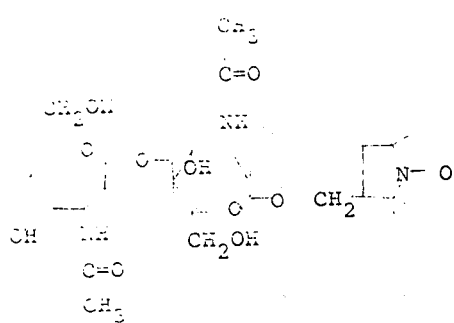

(1-oxyl-2,2,5,5-tetramethyl-3-pyrrolidinyl)methyl-β-N-acetyl-D-glucosamine

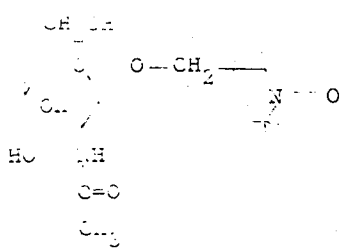

(1-oxyl-2,2,5,5-tetramethyl-3-pyrrolidinyl)methyl-β-chitobiose

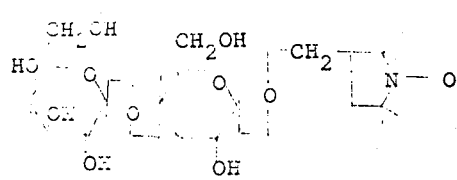

(1-oxyl-2,2,5,5-tetramethyl-3-pyrrolidinyl)methyl-(4-0-β-2-D-glucopyranose)

As previously indicated, the sensitizing compounds are those having a determinant site recognized by an antibody. These compounds include haptens and antigens. Antigenic materials include a wide variety of proteins, lipopolysaccharides, polysaccharides, and the like. Almost any organic compound can be haptenic. Haptenic compounds include hypnotics and sedatives, e.g., barbiturates; narcotic analgesics, e.g., morphine; central nervous system stimulants, e.g., strychnine and xanthines; local anesthetics, e.g., cocaine and procaine, anticholinesterase agents, parasympathomimetic agents, atropinic drugs, histamines and antihistamines, polypeptides, steroids, glycosides, saponins, sapogenins, diuretics, antibiotics, thyroid and anti-thyroid drugs, vitamins, etc.

Depending on the particular hapten involved, various techniques can be employed for linking the hapten to the sac. Normally, the same techniques which are available for linking antigens to the sac can be employed successfully with haptens. Alternatively, the hapten may be modified to provide an active functionality, such as a mixed anhydride or imidate, which is capable of reacting with functionalities present in the membrane wall.

Assay

There are two basic ways for carrying out the assay. In the first way, complement is present which provides for lysis of the sacs as a function of the amount of the material being assayed. In the second way, agglutination is employed, whereby the degree of agglutination is a function of the amount of material being assayed and the agglutination is carried out in the absence of complement.

After separation of the agglutinated sacs from the non-agglutinated sacs, the sacs may then be lysed, and the amount of unknown material determined by the distribution of the sacs between the agglutinated and non-agglutinated sacs.

The first method to be considered will be the method employing complement for lysis. An aqueous buffered medium is provided, normally buffered in the range of about 6 to 9, more usually from about 7 to 8. The buffered medium is isotonic with the osmolarity of the sacs. Some deviation of the osmolarity of the medium from isotonicity is permissible. Various buffers may be used, such as barbiturates, tris, phosphates, carbonates, borates, and the like. Inorganic salts will normally be present, such as sodium chloride, magnesium chloride, calcium chloride, and the like. The concentration of the salts will generally vary from about 0.01mM to about 0.25M, more usually from about 0.1mM to about 0.15M. The salts are present to provide the desired osmolarity, as well as stabilize the various proteins which are present in the solution.

While the order of addition may be widely varied, there will be preferred orders of addition. Where a hapten or antigen is to be determined, normally, the hapten or antigen will be combined with the appropriate antibody, under conditions for binding the antibody to the antigen or hapten. Incubation may or may not be carried out, as desired, depending on whether one wishes to allow for a competition between the antigen or hapten in the unknown and the sacs having the appropriate epitopic site. After the unknown and antibody have been combined, the appropriate sacs are then combined with the antibody. Again, incubation may be permitted, or complement promptly added, and the entire mixture incubated.

Incubations will generally be at from about 15° to 40°C, more usually from about 20° to 37°C. The time for incubation will generally vary from about 5 minutes to 1 hour, more usually from about 10 minutes to about 45 minutes.

The concentration of antibody employed will vary widely, depending on the binding constant of the antibody and the concentration range of interest of the unknown. Normally, the concentration of antibody will vary from about 0.1 to 1,000 (based on binding sites) times the number of molecules at the high end of the range of interest. The ratio of antibodies will, in many instances, be empirical and may be determined by employing standards having known concentrations of the antigen or hapten. The significant factor is that one wishes to obtain a detectable and differentiable signal over the range of interest.

After the incubation, the amount of lysis may be determined by introducing the sample or aliquot of the sample in an EPR spectrometer cavity and the peak-to-peak amplitude determined. By employing standards having known concentrations of the unknown, one can graph the peak-to-peak amplitude in relation to concentration of the unknown. The signal obtained can then be directly related to a particular concentration of the unknown.

The relative amounts of the various reactants used will depend upon the purpose of the particular assay. In general, the lower the concentration of sacs employed that can be used, the greater the sensitivity. The amount of spin label which may be released from each sac, the rate of spontaneous leakage, and the sensitivity of the spectrometer govern the lowest concentration of sacs which may be used successfully. Where either antibody or complement is to be determined, complement or antibody respectively is supplied at functional excess, and sacs are supplied at a concentration such that their lysis is a function of the concentration of the unknown. Where an antigen or hapten is to be determined by lytic inhibition, limiting antibody and excess complement are supplied along with a suitable concentration of sacs.

In the agglutination technique, sacs and antibody are combined to provide an appropriate concentration which will give agglutination. That is, a substantial proportion of the sacs present in the solution, usually at least 10 percent, can be separated from sacs which are not bound to antibody, for example, by centrifugation in gradients. By combining the unknown, sacs and antibodies in a buffered aqueous solution as described previously, the amount of antigen or hapten present in the unknown will affect the percentage of the sacs which agglutinate.

The agglutinated sacs may then be readily lysed in a wide variety of ways, including enzymatic lysis, employment of detergents, osmotic lysis, or the like. The determination of the number of free radicals present can be related to assays carried out with known amounts of antigen or hapten.

For descriptions of methods of agglutination, see Kabat, et al., "Experimental Immunochemistry" (1961) and Carpenter, "Immunology and Serology," Saunders, Philadelphia (1965).

Experimental

The following examples are offered by way of illustration and not by way of limitation.

(All temperatures not otherwise indicated are in centigrade. All parts or percentages not otherwise indicated are by weight.)

The following reagents were employed in the various experiments:

MATERIALS

VBS — Veronal Buffered Saline pH 7.30 ±0.05; 0.145M; 4.95mM 5,5-diethylbarbituric acid; 0.50mM $MgCl_2$; 0.15M $CaCl_2$ SRBC — Sheep Red Blood Cells twice washed with VBS and prepared as 5% and 50% suspension.

(C') — Complement guinea-pig blood allowed to clot for 1 hour at room temperature and then left at 4° for about 2 hours. Serum was withdrawn, centrifuged at 0°, absorbed twice with thrice-washed packed SRBC (0.3ml/10ml serum) at 0° for 5 mins. each absorption and divided into 0.5ml aliquots at 0° and stored in sealed ampoules at −20°. Or, Difco Laboratories C'.

HIC — Heat Inactivated Guinea Pig Complement guinea-pig complement inactivated by heating at 56° for 30 minutes.

NRS — Normal Rabbit Serum decomplemented serum absorbed against appropriate erythrocytes and stored at −20°.

(AS) — E. coli OB Antiserum Serotype 026:B6 ATCC No. 12795 lyophilized antiserum containing 1:1000 merthiolate (Difco Laboratories) decomplemented (56°, 1 hr.) and stored at 4°.

Anti-EA Rabbit Anti-egg Albumin Serum reconstituted lyophilized antiserum (Difco Laboratories), decomplemented (56°, 0.5 hr.), absorbed against the appropriate erythrocytes and stored at −20°.

Hemolysin (rabbit anti SRBC serum)

reconstituted lyophilized hemolysin, decomplemented (56°, 0.5 hr.), with VBS to desired concentrations, stored at −20°.

Ghost Resealing Solution pH 7.6; 0.20M tempocholine chloride; 0.050M KCl; 8.65mM 5,5-diethylbarbituric acid; 0.875mM $MgCl_2$; 0.263mM $CaCl_2$; 1.0mM adenosine triphosphate, disodium salt.

Lecithin — Egg Lecithin — standard solution

Lecithin extracted from egg yolk in non-oxidizing environment according to Singleton et al., J. Am. Chem. Soc. 42, 53 (1965) and made up as 50μmole/ml solution in argon-flushed ethanol, stored at −20°.

Cholesterol — Cholesterol — standard solution recrystallized cholesterol dissolved in ethanol at 50μmole/ml flushed with argon and stored at 4°.

DCP — Dicetyl Phosphate dicetyl phosphate as 5.5μmole/ml in toluene flushed with argon and stored at 4°.

ATLPS — Alkali-treated Lipopolysaccharide

50mg E. coli lipopolysaccharide 026:B6 extracted by method of Westphal, Bact. Rev. 30, 192 (1966) partially saponified (Kabat, supra; Kataoka, et al., Eur. J. Biochem. 21, 80 (1971) was suspended in 10ml 0.05M NaOH for 1 hour at 56°, acidified to slight acidity with AcOH and centrifuged at 27,000g for 0.5 hr. at 4°. The supernatant was dialysed against distilled water for 24 hrs. at 4°, recentrifuged at 80,000g for 1 hour at 4° and the resulting supernatant lyophilized and stored over $P_2O_5$.

(TC) — Buffered Tempocholine Chloride Solution

The compound was synthesized as described in Kornberg et al, Biochemistry 10, 111 (1971). A 0.1 M solution was prepared in VBS, which differed in having 0.045M NaCl. Preparation of the solution carried out within 2 days use.

(PBS) — Phosphate Buffer Solution 1. pH 7.40 ± 0.05, 0.11M sodium phosphate
2. pH 7.2, 0.074M NaCl, 0.018M $KH_2PO_4$, 0.039M $Na_2HPO_4$.

EXAMPLE 1

Comparison of Immune Lysis of Sheep Red Blood Cells Employing Optical Measurement of Released Hemoglobin with Spin Loaded Sheep Red Blood Cell Ghosts Employing EPR Measurement Erythrocyte ghosts were prepared as follows. A 50% SRBC suspension (0.2ml) was added slowly with mixing to 1ml 1:3 VBS:$H_2O$. The tubes were centrifuged at 4,500g for 10 mins. and 0.5ml of the supernatant removed and discarded. The original volume and isotonicity were restored by addition of 0.5ml resealing solution. The pellet was resuspended by use of a vortex mixer and the preparation then placed in a water bath maintained at 37° for 30 mins. for resealing to occur. After chilling the ghosts by placing the tube in an ice slush, the solution was centrifuged at 2,000g for 10 mins., the supernatant discarded and replaced with 1.90ml VBS (1% NRS). The pellet was resuspended and centrifugation and suspension repeated 5 times to yield a 5% SRBC. (0.1ml packed SRBC having been used in the preparation which had a final volume of about 2.0ml).

The two methods of determination were carried out by mixing cells or ghosts, antiserum and complement, incubating at 37° for 20 mins. and then chilling rapidly by placing in an ice slush bath. In the case of hemolysis, after centrifugation to remove unlysed cells and cell membranes, the supernatants were diluted to a known volume and the optical density was measured at 541nm using a Cary spectrophotometer. In the case of lysis of ghosts, the EPR signal was measured employing a Varian E4EPR spectrometer. The experiments were carried out to demonstrate the sensitivity of the two assays to variations in antiserum concentration. The antiserum was diluted with VBS to various dilutions, and the assay mixture for the hemolysis prepared by combining 0.80ml of a 5% cell suspension, 0.10ml of the hemolysin solution and 0.10ml of complement. As a control, in one tube 0.10ml of HIC' was employed with the 1:100 dilution of the antiserum. In the experiment employing ghosts, 0.20ml of a 5% suspension of the ghosts was combined with 0.025ml of the appropriately diluted hemolysin and 0.025ml of complement. A control was also carried out employing HIC'.

The following table indicates the observed results, with the results recorded as the response given by each antiserum dilution as a percentage of that given by the 1:200 dilution in excess of that given by the 1:∞ dilution.

TABLE I

| Hemolysin Dilution | Mean Value at OD 541nm | % Response | Peak to Peak Amplitudes between 3255g and 3275g | | % Response |
|---|---|---|---|---|---|
| | | | Gain $2.5\times10^2$ | Gain $6.2\times10^2$ | |
| 1:100 | 9.84 | | | | |
| 1:200 | 9.06 | 100 | 101.2 | | 100 |
| 1:400 | 6.27 | 64.4 | 72.4 | | 61.2 |
| 1:800 | 3.15 | 24.5 | 40.5 | | 18.2 |
| 1:1600 | 2.29 | 13.5 | 30.7 | 80.5 | 4.99 |
| 1:3200 | 1.54 | 3.96 | 28.4 | 73.0 | 1.89 |
| 1:6400 | 1.40 | 2.17 | 27.5 | 70.9 | 0.674 |
| 1:∞ (VES) | 1.23 | 0 | 27.5 | 67.5 | 0 |
| HIC' Control | 0.99 | | 25.8 | 65.0 | |

In both cases, the HIC' control showed less lysis than the 1:∞ dilution. This may be due to some increased stability afforded by the presence of more serum in the former tubes. The ghosts leak slowly and the samples were scanned in as short a time as possible. Samples were scanned starting with the tubes of highest antiserum concentrations and ending with the HIC' control to minimize the effect of leakage.

The results in Table I clearly demonstrate that varying concentrations of antibody can be readily determined employing stable free radical-containing ghosts.

EXAMPLE II

Preparation of Liposomes, Sensitization with Bacterial Lipopolysaccharides and Assay of Anti-Serum and Complement A liposome preparation was carried out to provide 3ml of a suspension containing 49.5μmoles of lipid per ml.

Standard lecithin solution (1.60ml) and 1.2ml standard cholesterol solution were placed in a flask under an argon atmosphere and evaporated to semi-dryness with a Rotary evaporator. To the residue was added 1.6ml of dicetyl phosphate solution to redissolve the lipids, and the solvent removed on a rotary evaporator at 40°. After complete removal of solvent, the flask was filled with argon, two glass beads added and 3ml of tempocholine chloride (TC) solution flushed with argon and then added to the lipids. Liposomes were generated by mixing using a Variwhirl mixer.

A 0.92cm i.d. column containing Sephadex G25 to a height of 28.5cm was equilibrated and eluted with VBS and employed at room temperature to remove unenclosed spin label from the liposomes. Volumes of 0.5–1ml were employed in each operation. All obviously opalescent eluate was collected in a calibrated tube, and the contents mixed gently by inversion to insure homogeneity and an approximate estimate of μmoles lipid per ml made. The resultant liposomes had a molar ratio lecithin:cholesterol:dicetyl phosphate of about 2.0:1.5:0.22.

The sensitization of the liposomes was carried out in both a passive and active manner. Passive sensitization is achieved by introducing ATLPS to already generated and clean liposomes. A known weight of ATLPS is dissolved in a little VBS and added to eluate containing clean liposomes. The mixture is left at room temperature for 40 mins. before further use.

Passive sensitization was carried out with 5, 10, 20 or 100μg ATLPS/μmole lipid. Maximal sensitization was achieved with between 5 and 10μg ATLPS/μmole lipid. The liposomes could be lysed with AS and C' at 25°, while non-sensitized liposomes were not lysed under the same conditions. No advantage was obtained by allowing the sensitization to be carried out for more than 40 mins.

Active sensitization was carried out by including in the liposome preparation solution 20μg ATLPS/μmole lipid.

The assay is carried out as follows. The liposome preparation at room temperature is diluted with VBS to provide a concentration of about 1.0μmole lipid per ml. The temperature should be maintained constant to avoid possible leakage of the spin label due to volume fluctuations.

Various dilutions of both complement and antibody were prepared using VBS. Also, a number of different blanks were prepared. Where the determination of complement was of interest, undiluted antiserum was employed, whereas where the concentration of antiserum was of interest, undiluted complement was employed. The liposomes employed had been passively sensitized with 10μg ATLPS/μmole lipid. Commencing with the highest concentration of interest and working down, the tubes were scanned at times exceeding 15 mins. after the addition of the solution being measured. The order of addition was liposomes, antiserum and complement.

For each experiment, the amplitude of the blank was subtracted from the amplitudes of all the other spectrums. These values were assumed to be proportional to the extent of lysis in any particular tube and were used to calculate the extent of lysis as a percentage of the total lysis given by freezing in liquid nitrogen and thawing. The following tables indicate the extent of lysis as a function of complement concentration and of antiserum concentration.

TABLE II

Extent of Lysis versus Complement Concentration*

| μlC'/500μl. of solution | % Lysis |
|---|---|
| 50.0 | 28.0 |
| 25.0 | 28.0 |
| 12.5 | 28.0 |
| 6.25 | 25.5 |
| 3.13 | 18.0 |
| 1.57 | 13.0 |
| 0 | 3.3 |

*HIC' control used as blank; AS used undiluted

TABLE III

Extent of Lysis versus Antiserum Concentration*

| μl AS/500μl. of solution | % Lysis |
|---|---|
| 10 | 32.0 |
| 5 | 31.8 |
| 2.5 | 24.5 |
| 1.3 | 21.5 |
| 0.6 | 15.8 |
| 0.3 | 10.0 |
| 0 | 1.0 |

*HIC' control used as blank; C' used undiluted

The results of Tables II and III with passively sensitized liposomes were found to be substantially the same, when actively sensitized liposomes were employed and assayed in the same manner. The results demonstrate that both complement and antibodies may be assayed by employing free radical-containing liposomes.

EXAMPLE III

Immune Lysis of Ghosts Sensitized with (Exogenous) Egg Albumin Materials

In this example, an antigen is covalently bonded to a ghost. The following is the preparation of the egg albumin sensitized ghost. bis-Diazotized benzidine chloride (0.64g, 2.5 × 10⁻³ moles) was dissolved in 13ml 1N HCl and 77ml distilled water at 4° and 0.35g sodium nitrite in 10ml distilled water added with stirring at 4°. The temperature was maintained and stirring continued for 6 hours. For use, a 0.5ml aliquot is dissolved in 7ml phoshate buffer at 0°.

Unless otherwise indicated, all further operations were carried out at 0°.

To 2ml of diluted VBS (1:3) was added 0.4ml 50% washed SRBC, the solution mixed and the resulting lysed cell membranes centrifuged to a pellet. Exactly 1ml of the supernatant solution was removed and replaced by 1ml of ghost resealing solution. After thorough mixing, the tube was incubated at 37° for 60 mins., cooled in an ice-slush bath for 10 mins. and then centrifuged. After discarding the supernatant, the ghosts were washed four times with 4ml VBS (1% NRS), then suspended in 4ml 0.1% egg albumin solution. To the suspension was added 3.1ml VBS followed by 0.25ml of the diazotized benzidine. After gentle mixing, the reaction was allowed to proceed at room temperature for 10 mins., followed by the addition of 15ml of VBS (1% NRS). After mixing, the ghosts were centrifuged, the pellet washed with 15ml VBS (1% NRS), followed by washing with 4ml of VBS (1% NRS). Final suspension in 4ml of VBS (1% NRS) gave a concentration of about 5% based on the volume of the original SRBC to the final volume of the ghost preparation.

The following tubes were prepared, incubated at 37° for 20 mins., chilled in an ice bath and the EPR spectrum taken. For total lysis, ghost samples were diluted with an equal volume of distilled water.

TABLE IV

| Assay | Composition, Volume, ml | | |
|---|---|---|---|
| | 5% Suspension Ghosts | AS/NRS/VBS | C'/HIC'/VBS |
| Complete (whole AS) | 0.2 sensitized | 0.025 AS | 0.025 C' |
| Complete (1:4 AS) | 0.2 sensitized | 0.025 1:4 AS | 0.025 C' |
| Complete (1:8 AS) | 0.2 sensitized | 0.025 1:8 AS | 0.025 C' |
| NRS Control | 0.2 sensitized | 0.025 NRS | 0.025 C' |
| HIC' Control | 0.2 sensitized | 0.025 AS | 0.025 HIC' |
| Sensitized blank | 0.2 sensitized | 0.025 VBS | 0.025 VBS |
| Non-sensitized complete | 0.2 non-sensitized | 0.025 AS | 0.025 C' |
| Non-sensitized blank | 0.2 non-sensitized | 0.025 VBS | 0.025 VBS |

Immune lysis of spin label-loaded ghosts was shown to be a function of specific antibody concentration, complement activity and the presence of the appropriate antigen or the ghost membrane.

EXAMPLE IV

Determination of Egg Albumin Using Egg Albumin Sensitized Spin Label Containing Ghosts The egg albumin sensitized ghosts were prepared using ghosts prepared as described previously in one-fourth the amount. However, instead of SRBC, human red blood cells of either type A or O were employed, which were further washed with PBS (2). To the pellet obtained after the last washing was added 120mg recrystallized egg albumin dissolved in 1.5ml of the above phosphate buffer. After thorough mixing, 20mg of N-ethyl, N'-(3-dimethylaminopropyl) carbodiimide hydrochloride in 0.2ml distilled water was added slowly with mixing. After standing at 20° for 30 mins., the mixture was centrifuged at 2,000g for 10 mins., and the supernatant discarded. The ghosts were washed four times with 3ml VBS (1% NRS) and finally suspended in 10ml fresh VBS (1% NRS) to give a preparation derived from an approximately 0.5% cell suspension.

The assay was carried out as follows. A 10 $\mu$g per ml solution of egg albumin in VBS (1% NRS) was subjected to several tenfold dilutions. To duplicated series of tubes was added 0.1ml of each of the antigen solutions and to four tubes in each set was added 0.1ml VBS (1% NRS) containing no egg albumin. To each of the tubes was added a solution of one part of rabbit anti-egg albumin serum (anti-EA, purchased from Difco Laboratories) diluted with 19 parts VBS (1% NRS) and the contents mixed with shaking. Sufficient anti-serum was present to provide 50% lysis in the absence of egg albumin. With some experiments, the tubes were incubated at 37° for 30 mins. prior to chilling on ice for 15 mins., while in others, the incubation step was omitted.

To each of the tubes was then added 0.1ml 0.5% ghost suspension followed by 25$\mu$l C' or, in the case of two of the tubes having no egg albumin, 25$\mu$l HIC' was added to give the HIC' controls. The tubes were mixed by shaking and placed in a water bath at 37° for 45 mins., after which time they were removed and chilled on ice. Samples were withdrawn and placed in cells constructed from 50$\mu$l micropipettes just before scanning at about 4° with a temperature controlled Varian E4 spectrometer. The cells were placed horizontally in the cavity to avoid errors caused by settling. The tubes containing the lowest concentrations of antigen were routinely sampled and scanned first. However, in one experiment, the order was reversed and essentially the same results were obtained. The parameter chosen for reporting the results expresses the difference in amplitude in the EPR spectrum from the mean of those given by the two zero antigen control tubes as a percentage of the difference between that mean and the mean of those given by the HIC' control tubes. The following table reports the results.

TABLE V

| Egg Albumin −log M | Hemolytic Augmentation Effect[3] % Response | |
|---|---|---|
| | 37° incubation[1] | premixed at 0°[2] |
| 7 | −80 | −50 |
| 8 | +20 | +50 |
| 9 | +58 | +40 |
| 10 | +50 | +20 |
| 11 | +30 | 0 |

[1] Antigen and antibody preincubated at 37°.
[2] Antigen and antibody premixed at 0°.
[3] Compared to lysis obtained in the absence of aqueous phase antigen.

The above results show the extreme sensitivity of the subject method for the determination of the antigen egg albumin. It should be further noted that in the concentration range of $10^{-7}$ to $10^{-9}$ for the preincubated determination, lysis increases with decreasing antigen concentration having a maximal augmentation at $10^{-9}$M. In the concentration range of $10^{-9}$ to $10^{-11}$, lysis increases with increasing concentration. See Humphries and McConnell, PNAS, in press.

The subject invention provides sacs containing stable free radicals at a sufficient concentration to insure substantial broadening of the EPR spectrum peaks (increased peak width) and substantial reduction in peak amplitude. The sacs can be used in immunoassays for the determination of antibodies, complement, or in competitive systems with haptens and antigen. In effect, the haptens and antigen affect the availability of the antibody for combining with the sac for complement lysis or agglutination. Because of the large number of stable free radicals which are released from the sac upon lysis, a large multiplication factor is achieved. Thus, extremely sensitive assays are achieved, whereby a wide variety of compounds can be readily determined.

Although the foregoing invention has been described in some detail by way of illustration and example for purposes of clarity of understanding, it will be obvious that certain changes and modifications may be practiced within the scope of the appended claims.

What is claimed is:

1. A composition useful in immunoassay comprising vesicles or liposomes having at least one epitopic site on the external walls thereof, said walls enclosing an aqueous medium including stable free radicals comprising electron spin resonance labels, said free radicals being in sufficient concentration to provide an electron paramagnetic resonance spectrum of at least about 3 gauss in half width, peak to peak, at a resonance frequency of about 9.2 gigahertz.

2. The composition of claim 1 wherein said epitopic site is covalently bonded to said wall.

3. The composition of claim 1 wherein said epitopic site is adsorbed on said wall.

4. The composition of claim 1 wherein said electron spin resonance label is an organic nitroxide.

5. The composition of claim 4 wherein said wall is a bilayer membrane.

6. The composition of claim 4 wherein said nitroxide is a salt.

7. The composition of claim 4 wherein the nitroxide is a neutral molecule.

8. A composition useful in immunoassay comprising erythrocyte ghosts having at least one epitopic site on the external walls thereof, said walls enclosing an aqueous medium including stable free radicals comprising electron spin resonance labels, said free radicals being in sufficient concentration to provide an electron paramagnetic resonance spectrum of at least about 3 gauss in half width, peak to peak, at a resonance frequency of about 9.2 gigahertz.

9. The composition of claim 8 wherein said epitopic site is covalently bonded to said wall.

10. The composition of claim 8 wherein said electron spin resonance label is an organic nitroxide.

11. The composition of claim 10 wherein said organic nitroxide is a salt.

12. The composition of claim 10 wherein said organic nitroxide is a neutral molecule.

* * * * *